United States Patent [19]
Glasgow

[11] Patent Number: 5,516,061
[45] Date of Patent: May 14, 1996

[54] SHROUD FOR A REVERSIBLE THRUST FAN

[75] Inventor: Edsel R. Glasgow, Glendale, Calif.

[73] Assignee: Lockheed Corporation, Calabasas, Calif.

[21] Appl. No.: 308,891

[22] Filed: Sep. 19, 1994

[51] Int. Cl.$^6$ ..................................................... B64C 11/00
[52] U.S. Cl. .................... 244/53 R; 244/110 B; 244/65; 60/226.2; 239/265.29
[58] Field of Search ................. 244/12.5, 23 D, 244/23 R, 53 B, 65, 110 B; 239/265.29, 265.31; 60/226.2, 229; 415/79, 144, 145

[56] References Cited

U.S. PATENT DOCUMENTS

| | | | |
|---|---|---|---|
| 3,059,878 | 10/1962 | Kerry | 244/53 B |
| 3,664,612 | 5/1972 | Skidmore et al. | 244/53 |
| 3,747,341 | 7/1973 | Davis | 60/226.2 |
| 3,747,855 | 7/1973 | Vdoviak et al. | 239/265.29 |
| 3,824,785 | 7/1979 | Soligny | 60/226.2 |
| 3,964,257 | 6/1976 | Lardellier | 60/226.2 |
| 4,474,344 | 10/1984 | Bennett | 244/53 B |
| 4,591,097 | 5/1986 | Thayer | 239/265.29 |
| 5,014,933 | 5/1991 | Harm et al. | |
| 5,090,196 | 2/1992 | Balzer | 60/226.2 |
| 5,242,132 | 9/1993 | Wukowitz | 244/106 |
| 5,343,696 | 9/1994 | Rohra | 244/110 B |

OTHER PUBLICATIONS

AIAA–81–1396 "Zero Length Inlets For Subsonic U/STOL Aircraft", Jul. 27–29, 1989 by E. R. Glasgow.
AIAA–80–1245 "Zero Length Slotted–Lip Inlet For Subsonic Military Aircraft", Jun. 30–Jul. 2, 1980 by E. R. Glasgow.

*Primary Examiner*—Galen L. Barefoot
*Attorney, Agent, or Firm*—Louis L. Dachs

[57] ABSTRACT

The invention is a shroud for a reversible thrust fan, the shroud having a inlet duct and an exhaust nozzle with the fan located there between. In general terms, the shroud includes a system for increasing the efficiency of the exhaust nozzle when acting as an inlet duct when the fan is providing reverse thrust. The system comprising a plurality of auxiliary inlet duct systems spaced about the circumference of the exhaust nozzle in proximity to the rear end thereof, the auxiliary inlet duct systems extending from the exterior surface of the exhaust nozzle to the interior surface thereof. The auxiliary inlet duct systems are movable from a closed position to an open position wherein air can be drawn from the exterior surface of the exhaust nozzle to the interior thereof when the fan is providing reversed thrust.

2 Claims, 6 Drawing Sheets

SHROUD FOR A REVERSIBLE THRUST FAN

BACKGROUND OF THE INVENTION

1. Field of the Invention

The invention relates to the field of propulsion systems for aircraft and, in particular, to a shroud for a reversible thrust fan.

2. Description of Related Art

Fan shrouds are traditionally designed to have low external drag and provide high pressure and high quality flow to the forward thrusting fan. Additionally, the shroud is generally designed to provide these high efficiency characteristics at cruise conditions, where the aircraft spends most of its flight time. For conventional subsonic transport aircraft that cruise at high altitude and speed, a moderately thin and low radius entry lip is acceptable for both cruise and for takeoff and low speed flight. For a conventional and STOVL supersonic aircraft, a thin sharp entry lip of minimum radius is required for high speed operation. Such an entry lip is adequate to supply a sufficient quantity of air to the engine during high speed flight because of the ramming effect due to the velocity of the aircraft. However, such an entry lip generally doesn't have sufficient radius to supply a sufficient quantity of air to the engine during take-off and low-speed flight. For a STOVL subsonic aircraft, the entry lip used for conventional subsonic transport aircraft is acceptable for cruise but a large radius "fat" entry lip of a bellmouth type is preferred to prevent lip loss turbulence and loss of boundary layer control during takeoff, hover, and vertical landing.

Thus auxiliary air intakes are often incorporated into the shroud inlet. These can take the form of simple passively operated "blow" in doors that are spring biased to the closed position. Such doors open in response to a decrease in the internal pressure within the inlet duct that occurs when the fan draws in air during take-off. As speed increases and ram air effects take hold, the pressure within the shroud increases causing the doors to close. Often more sophisticated systems are incorporated, such as the disclosed in U.S. Pat. No. 3,664,612, "Aircraft Engine Variable Highlight Inlet" by W. E. Skidmore, et al. In this design two airfoils are pivotally mounted at the leading edge of the shroud that are extended to form an aerodynamically clean auxiliary intake. Another approach is to incorporate an extendible lip to form an auxiliary inlet passage. Such a system is disclosed in U.S. Pat. No. 5,014,933, "Translating Lip Aircraft Cowling Structure Adapted For Noise Reduction" by D. J. Harm, et al. In both instances, the main thrust of the inventions is to improve the low speed efficiency of a fan shroud inlet designed for high speed operation. The effectiveness of such devices are discussed in articles such as AIAA-81-1396 "Zero Length Inlets For Subsonic V/STOL Aircraft" by (AIAA/SAE/ASME 17th Joint Conference, Jul. 27–29, 1989, and AIAA-80-1245 "Zero Length Slotted-Lip Inlet For Subsonic Military Aircraft" (AIAA/SAE/ASME 16th Joint Conference, Jun. 30–Jul. 2, 1980 both by E. R. Glasgow, et al.

For fans operating in the low speed range, such as found on lighter-than-air vehicles that operate in the 70 knot range, not only is it important to have an inlet entry lip with a large radius to reduce flow separation, it is equally important to have a gentle external boattail slope to reduce pressure drag and a sharp trailing edge to eliminate nozzle base drag. With the overall speed range so low, no efficiency enhancing auxiliary devices to increase flow into the inlet of the shroud are necessary. However, if reverse thrust operation of the fans is going to be used to aid in critical airship docking maneuvers, wherein the exhaust nozzle becomes the inlet, severe losses in fan efficiency will be experienced. In fact, in some instance fan efficiency is reduced by 80 percent. However, the inlet to the shroud performs fairly well as an exhaust nozzle. Consideration has been given to rotating the nacelles 180 degrees to eliminate this unacceptable loss in propulsive efficiency. However, the reduced response time in critical docking maneuvers is, in many instances, unacceptable.

Thus it is a primary object of the subject invention to provide a system for increasing the efficiency of a fan shroud designed for use with a fan normally operating in a low forward speed range when providing reverse thrust.

It is another primary object of the subject invention to provide a passive system for increasing the efficiency of the fan shroud designed for use with a fan operating in a low forward speed range when providing reverse thrust.

It is a further object of the subject invention to provide a passive system for increasing the efficiency of a fan shroud designed for use with a fan operating in a low forward speed range when providing reverse thrust that does not significantly interfere with shroud performance when the fan is operating in the normal forward thrust mode.

SUMMARY OF THE INVENTION

For fans operating in the low speed range, such as found on lighter-than-air vehicles that operate in the 70 knot range, not only is it important to have a inlet entry lip with a large radius to reduce flow separation, it is also important to have a gentle external boattail slope to reduce pressure drag and a sharp trailing edge to eliminate nozzle base drag. However, if the fan is reversible, the sharp trailing edge of the exhaust nozzle will be very inefficient as an inlet, in fact, efficiency can be reduced to around 20 percent level. The subject invention is a system for increasing the efficiency of a shroud for a reversible thrust fan, the shroud having an inlet duct and an exhaust nozzle with the fan located there between. In general terms the system includes a plurality of auxiliary inlet duct systems located about the circumference of the exhaust nozzle in proximity to the end thereof. The auxiliary inlet duct systems are actuable from a closed to an open position for providing auxiliary air from the exterior surface of the exhaust nozzle to the interior surface thereof when the fan is operating in a reversed thrust condition.

In one embodiment, the system for increasing the efficiency of the exhaust nozzle incorporates a plurality of auxiliary inlet slots in proximity to the end thereof extending from the exterior surface of the exhaust nozzle to the interior surface thereof. A door is mounted within each of the slots having an external surface conforming to the contour of the external surface of the exhaust nozzle. The door is movable from a closed position wherein the external surface is flush with the outer contour of the exhaust nozzle and the slot is closed off to an open position wherein air can flow from the exterior of the exhaust nozzle to the interior thereof. The door is spring biased to the closed position so that it opens only when the fan is providing reverse thrust. Thus when the fan is reversed, it causes the air pressure within the exhaust nozzle to drop below the external air pressure on the nozzle boattail and the doors automatically "blow" open. This causes an increase in efficiency because the pressure loss of the air flowing through the slot is less than that associated with the air flowing around the nozzle trailing edge. If the slot is located close to the nozzle trailing edge, the flow through the slot has the effect of making the trailing edge appear to have an aerodynamic lip radius that is considerably larger than that associated with the trailing edge.

The door can be in the form of an airfoil pivotally mounted to the aft end of the slot having a portion of the top surface thereof conforming to the contour of the external surface of the exhaust nozzle and a bottom surface conforming to the internal surface of the exhaust nozzle. The airfoil is movable from a closed position wherein the top surface thereof is aligned with the contour of the external surface of the exhaust nozzle to an open position aligned with the aft end of the slot. A spring is used to bias the airfoil toward the closed position. The spring tension must be sufficient to close the door prior to the fan flow returning to the forward thrust mode. If not, the door maybe held open by the force of the fan flow.

The single door system can be improved by adding a second slot having an opening on the top external surface of the exhaust nozzle forward of the opening of the first slot and a rearward extending passage extending through the shroud and exiting into the first slot. A second airfoil is pivotally mounted to the forward end of the second slot having a top surface thereof also conforming to the contour of the external surface of the exhaust nozzle. The second airfoil is movable from a closed position wherein the top surface thereof is aligned with the contour of the external surface of the exhaust nozzle to an open position aligned with the forward end of the second slot. A spring is also used to spring bias the second airfoil to the closed position thereof. The forward wall of the first slot and the top surface of the airfoil are contoured to form an aerodynamically smooth airflow passage from the exterior surface to the interior surface of the exhaust nozzle when the airfoil is in the open position.

In another embodiment the system includes chevron shaped slots having a recess in the external surface of the exhaust nozzle at the forward end thereof. A door is pivotally mounted by one end in the recess of the slot having a top surface conforming to the contour of the external surface of the exhaust nozzle. The door is movable from a closed position wherein the top surface thereof is aligned with the contour of the external surface of the exhaust nozzle to an open position aligned with the forward end of the slot. A spring is used to bias said door toward the closed position. Thus in this design, the door does not protrude into the interior of the exhaust nozzle when in the open position and there is no possibility of the door being held open when the fan provides forward thrust. It should be noted that having closed off slots in the exhaust nozzle when providing forward thrust does not unduly degrade performance. However, second and third doors can be pivotally mounted to the exit of the slot that are movable from a closed position aligned with the interior surface of the exhaust nozzle to an open position. Preferably, the second and third doors, which are spring biased to the closed position, have an axis of rotation aligned with the exhaust nozzle so that there is no tendency for the fan exhaust to hold the these doors open when the fan is providing forward thrust.

An additional embodiment involves the use of auxiliary duct systems that includes a plurality of slots, each having an opening on the external surface and an exit on the internal surface of the exhaust nozzle. First and second doors, having top surfaces thereof conforming to the contour of the external surface of the exhaust nozzle, are pivotally mounted by their first ends to the top of the fore and aft walls of the slot, respectively. These first and second doors are movable from a closed position wherein the top surfaces thereof are aligned with the external surface of the exhaust nozzle with their second ends in an overlapping relationship sealing off the slot to an open position aligned with the fore and aft walls of the slot. Again springs are used to bias the doors to the closed position. Third and fourth plurality flaps are pivotally mounted in the exit of the slot that are movable from a closed position aligned with the exterior surface of the exhaust nozzle to an open position aligned with the slot. The pivot axis of the flaps are offset to one end thereof so that a reduction in pressure within the exhaust nozzle will cause the flaps to move to the open position. The flaps are also spring biased to the closed position.

A still further embodiment involves the incorporation of a plurality of slats mounted on the aft end of the exhaust nozzle. The slats are extendible from a retracted position flush with the exhaust nozzle to a rearward extended position creating a plurality of slots extending from the external surface of the exhaust nozzle to the interior thereof. The rear end of the slat and the front end of the slot form an aerodynamically smooth airflow passage from the exterior surface to the interior surface of the exhaust nozzle when the slat is in the extended position. A hydraulic cylinder or the like is used to extend and retract the slat.

The novel features which are believed to be characteristic of the invention, both as to its organization and method of operation, together with further objects and advantages thereof, will be better understood from the following description in connection with the accompanying drawings in which the presently preferred embodiment of the invention is illustrated by way of example. It is to be expressly understood, however, that the drawings are for purposes of illustration and description only and are not intended as a definition of the limits of the invention.

DESCRIPTION OF THE PREFERRED EMBODIMENT

Figure 1:
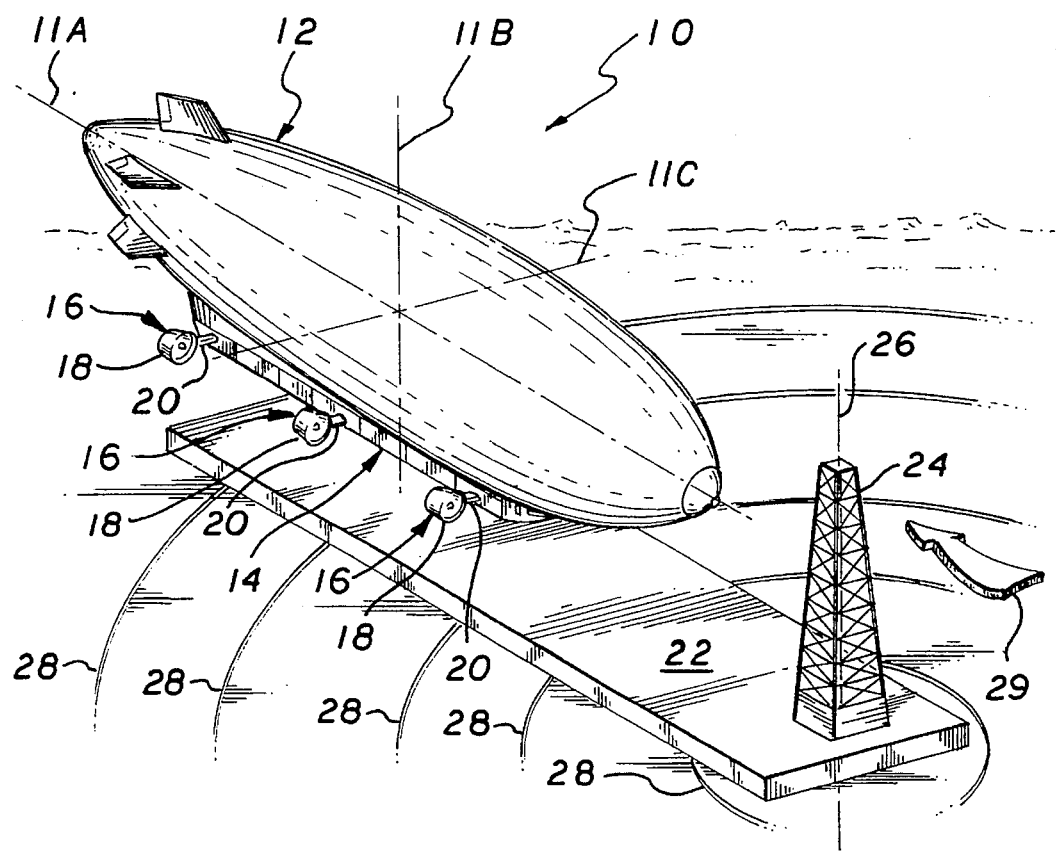
FIG. 1 is a perspective view of a lighter-than-air vehicle approaching a mooring platform.

Illustrated in FIG. 1 is a lighter-than-air vehicle, generally indicated by numeral 10 having a longitudinal axis 11A, vertical axis 11B and a lateral axis 11C. The vehicle includes a gas bag 12 having a gondola 14, suspended therefrom. A plurality of propulsion systems 16 each including a ducted fan 18 mounted on a pylon 20 are mounted on the gondola 14. The pylon is rotatable upwards and downwards in a plane parallel to the lateral axis 11C and the ducted fan 16 is rotatable about the end of the pylon. The detail design of such a propulsion system is disclosed in U.S. Pat. No. 5,333,817 "Propulsion For A Lighter-Than-Air Vehicle" by J. Kalisz, et al., which is herewith incorporated by reference into this specification. The vehicle 10 is shown approaching a docking platform 22 having a docking tower 24 at one end. The docking platform 22 is rotatable about a vertical axis 26 aligned with the docking tower 24 on a series of circular tracks 28. Such a Platform is disclosed in U.S. Pat. No. 5,346,162 "A Cargo Compartment For A Lighter-Than-Air Vehicle" by R. C. Belie, et al. which is herewith incorporated by reference into this specification.

Docking is one of the most critical maneuvers for such vehicles because of their extreme sensitivity to changes in wind direction and velocity. Thus the platform 22 is rotatable so that is alignable with the wind direction and is constantly adjusted to maintain such alignment. The vehicle 10, in order to maintain a maximum degree of control, approaches the tower 24 heading into the wind, the direction of which is indicated by numeral 29. With shifting winds, the ability to rapidly change the direction of thrust, including thrust reversal, of the ducted fans is extremely important. While it is possible to rotate the ducted fans 18 one hundred and eighty degrees, the response time, in most instances, will be inadequate, particularly when one considers that the diameter of the ducted fan on large vehicles is on the order of 20 plus feet. Thus thrust reversal is the answer. As previously discussed, however, an efficient duct design suitable for cruising at 70 knots, when providing reverse thrust can be very inefficient. In fact, propulsive efficiency can drop to as low as 20 percent, requiring an increase in the size of the of the power plants to accommodate docking maneuvers. The subject invention eliminates this need.

Figure 2:
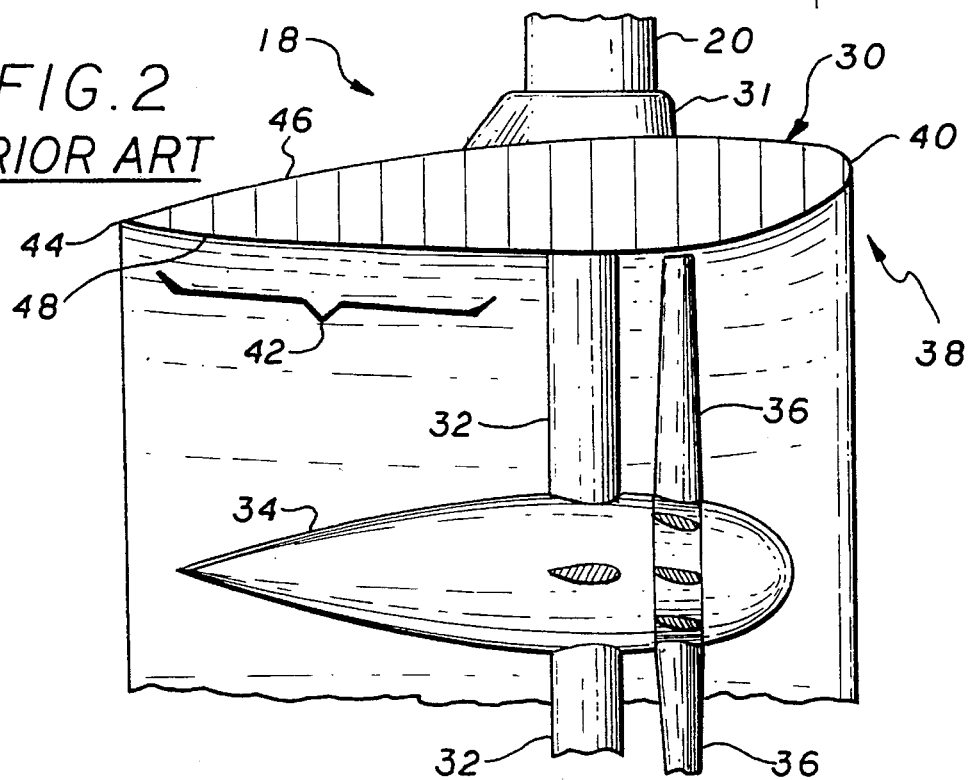
FIG. 2 is partial cross-sectional view of a conventional prior art shroud for a fan operating on a low speed vehicle such as the lighter-than-air vehicle shown in FIG. 1.

Illustrated in FIG. 2 is a partial cross-sectional view of the existing prior art ducted fan 18. The fan shroud 30 is rotatably mounted on the end of the pylon 20 and is rotated by a gear box assembly 31. A plurality of struts 32 couple the shroud 30 to a center body 34 that mounts the actual multi-bladed fan 36. Note that while not illustrated in the Figure, a powerplant (not shown) mounted within the gondola 14 is coupled to a drive shaft mounted within the pylon 20 and a strut 32 and is coupled to via a transmission (not shown) mounted in the centerbody 34. The details of the propulsion system can be found in the previously mentioned U.S. patent to Kalisz, et al. The shroud 30 includes an inlet portion 38 having a well rounded lip 40 and an exhaust nozzle portion 42 having a sharp edged trailing edge 44. The external and internal surface of the nozzle portion 42 are indicated by numerals 46 and 48, respectively. Such a shroud design provides very high efficiency for the 70 knot lighter-than-air vehicle 10. However, as previously mentioned, the nozzle portion 42, with its sharp trailing edge 44, is very inefficient as an inlet, when the fan is reversed.

Figure 3:
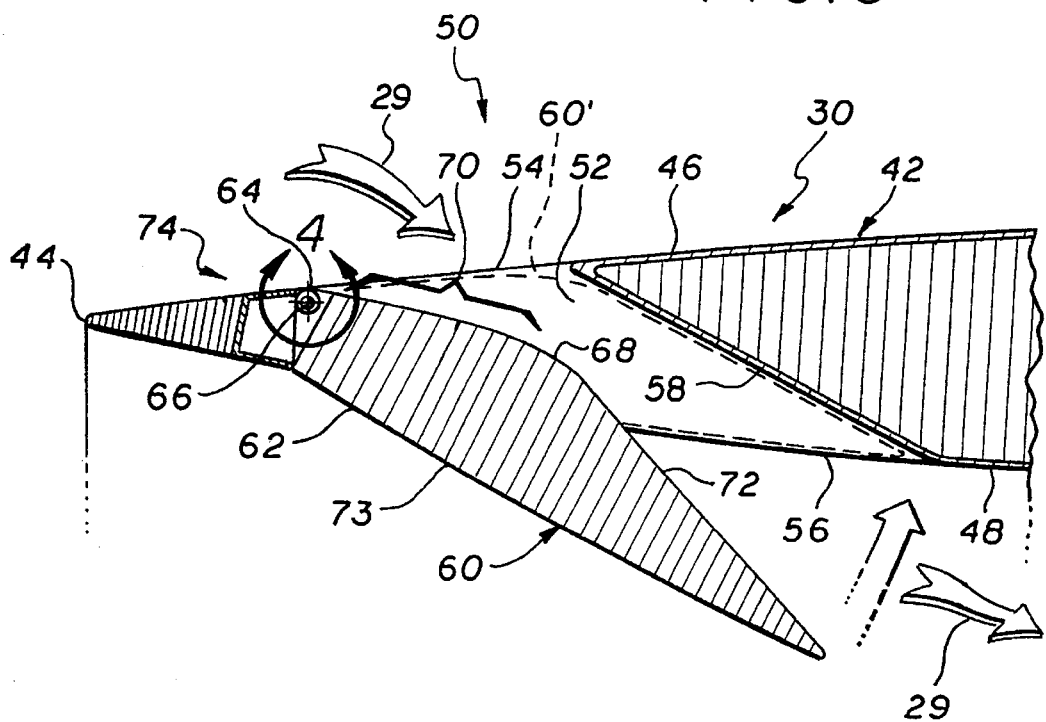
FIG. 3 is a cross-sectional view of the shroud shown in FIG. 2 for a fan operating on a low speed vehicle such as the lighter-than-air vehicle shown in FIG. 1 incorporating the subject system for increasing the efficiency of the exhaust nozzle when acting as an inlet duct when the fan is providing reverse thrust.
Figure 6:
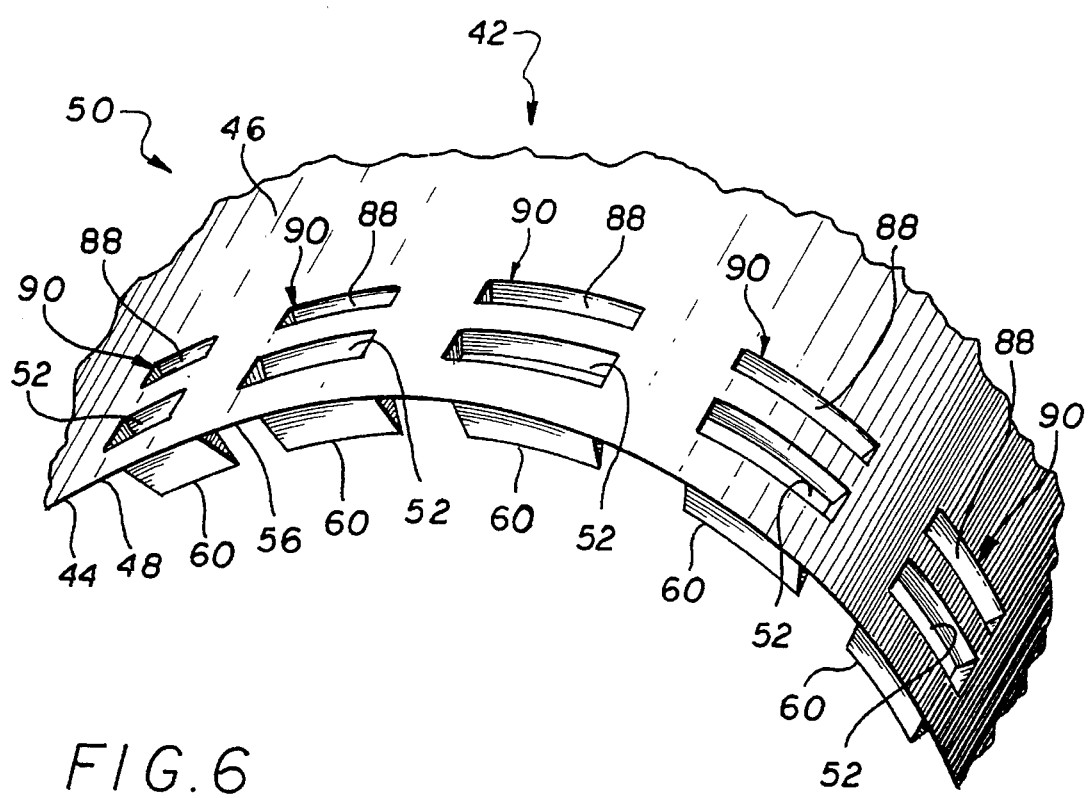
FIG. 6 is a partial perspective view of the exhaust nozzle of the shroud shown in FIG. 5 illustrating the system shown in FIG. 5 in the activated mode.

Illustrated in FIG. 3 is an enlarged view of a portion of the exhaust nozzle portion 42 of the shroud 30 shown in FIG. 2 incorporating a first embodiment of the system, indicated by numeral 50. This first embodiment is also illustrated in FIG. 6. The system 50 includes a plurality of slots 52 in the exhaust nozzle portion 42 just forward of the trailing edge 44, having an opening 54 on the external surface 46 and an exit 56 on the internal surface 48. The forward surface 58 of slot 52 slants forward producing an exit 56 larger than the opening 54. An airfoil 60 is pivotally mounted at its rear end 62 to the aft end 64 of the slot 54 with a pivot axis 66. Thus the airfoil 60 is rotatable from the open position shown to a closed position, shown in dotted lines and indicated by numeral 60', filling the slot 52. The upper surface 68 of the airfoil 60 includes a first surface 70 conforming to the external surface 46, and a second surface 72 that abuts the forward surface 58 when the airfoil is in the closed position. The airfoil 60 further includes a lower surface 73 that conforms to the internal surface 48 when the airfoil is in the closed position. In the open position, the upper surface 70 of the airfoil 60 and the forward surface 58 of the slot 52 provide an auxiliary air inlet that significantly improves the efficiency of the exhaust nozzle when acting as an inlet. The airfoil 60 is spring biased to the closed position by a spring mechanism that will be subsequently discussed. When the fan 36 is operating in the reverse thrust mode, the air pressure within the exhaust nozzle will drop below ambient and the airfoil 60 will be "sucked" open. When the fan 36 returns to normal operation, the airfoil 60 will automatically return to the closed position 60'.

Figure 4:
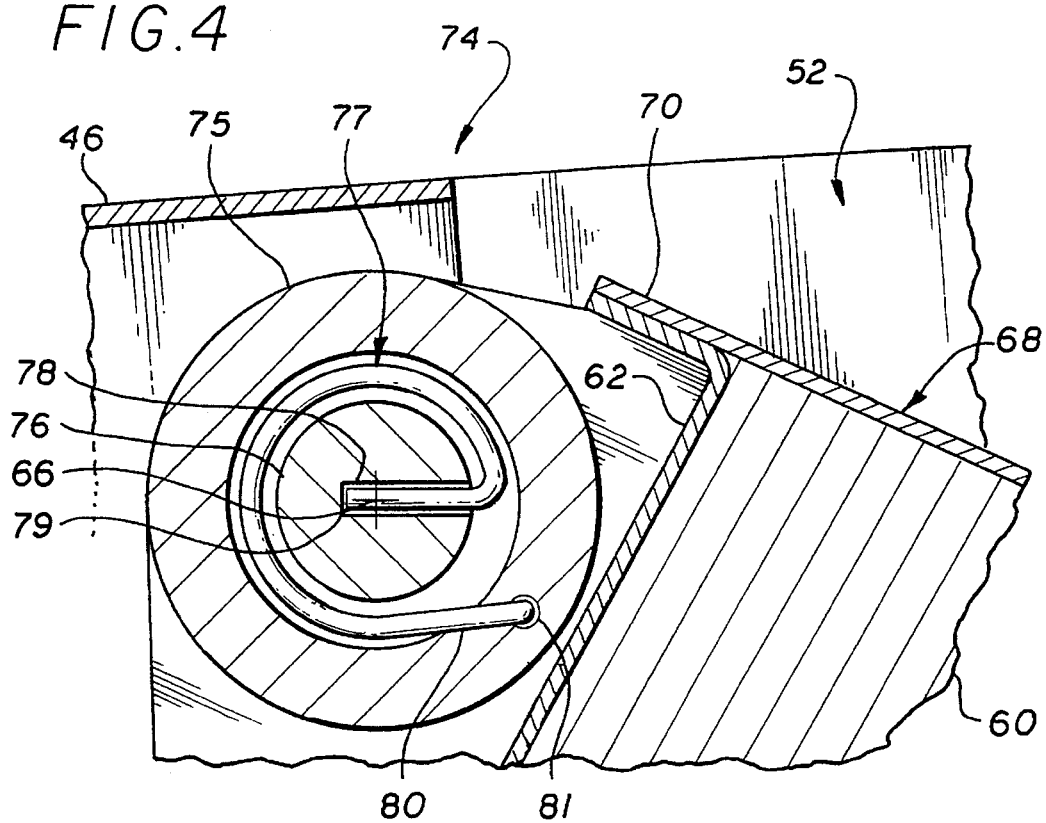
FIG. 4 is an enlarged view of a portion of the exhaust nozzle portion of the shroud shown in FIG. 3 illustrating the spring biasing system for biasing the system to the closed.

FIG. 4 illustrates a spring mechanism 74 that is used to bias the airfoil to the closed position. It can be seen that the airfoil 60 is attached at a end 62 to a hollow shaft 75, that is rotatably mounted on a solid shaft 76 for rotation about the axis 66. A coil spring 77 is mounted on the shaft 76 having a first end 78 retained in a hole 79 in the shaft 76 and a second end 80 retrained in a hole 81 in the shaft 75. Thus the airfoil 60 is spring biased to the closed position 60' (shown in FIG. 3). It should be noted that there are numerous other methods of biasing the airfoil 60 (door) to the closed position and the above example is for purposes of illustration only.

Figure 5:
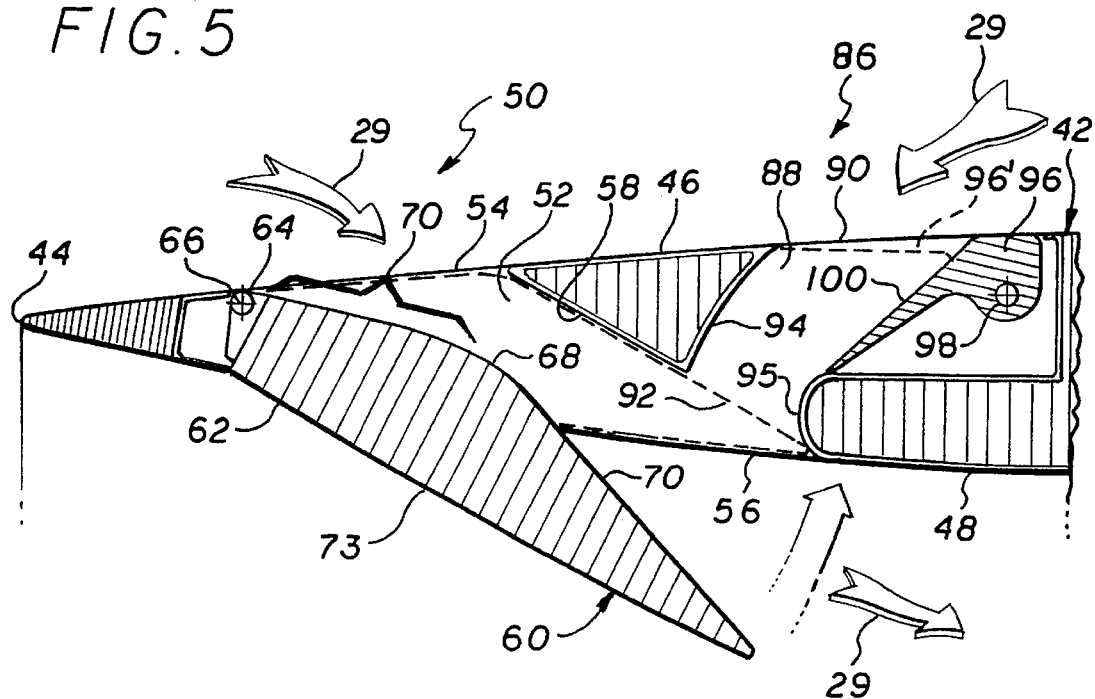
FIG. 5 is a view similar to FIG. 3 with illustrating a second embodiment of the system.

The efficiency of the above described system 50 shown in FIG. 3 can be improved by incorporating a secondary air inlet system 86 as illustrated in FIGS. 5 and 6. The system 86 includes a plurality of slots 88 in the exhaust nozzle portion 42 just forward of the system 50, having an opening 90 on the external surface 46 and an exit 92 on the forward surface 58 of slot 52. The rear surface 94 and the bottom of the forward surface 95 of the slot 88 are curved and rounded, respectively, to provide an efficient air flow path. A door 96 having an upper surface 100 that conforms to the external surface 46 of the exhaust nozzle 42, is pivotally mounted at its forward end to the forward end of the slot 98. The door 96 has an axis of rotation 98 such that it is rotatable from a open position, as illustrated to, a closed position indicated in doted lines and numeral 96'. The door 96 is also spring biased to the closed position in a manner similar to the airfoil 60 shown in FIG. 3. Thus when the fan is operating in the reverse thrust mode causing the pressure within the exhaust duct to drop below ambient, the door 96 will open in conjunction with the airfoil 60 providing increased air flow into the exhaust nozzle portion 42, further improving efficiency.

It should be noted that, in the two embodiments illustrated in FIGS. 3 through 6, care must be exercised in selecting the spring used for biasing the airfoil 60 to the closed position, for the force must be sufficient to insure that it will close before the fan can be reversed. If not, the over pressure within the exhaust nozzle will cause the airfoil to remain open, creating a disruption of the exhaust flow from the now forward thrusting fan.

Figure 7:
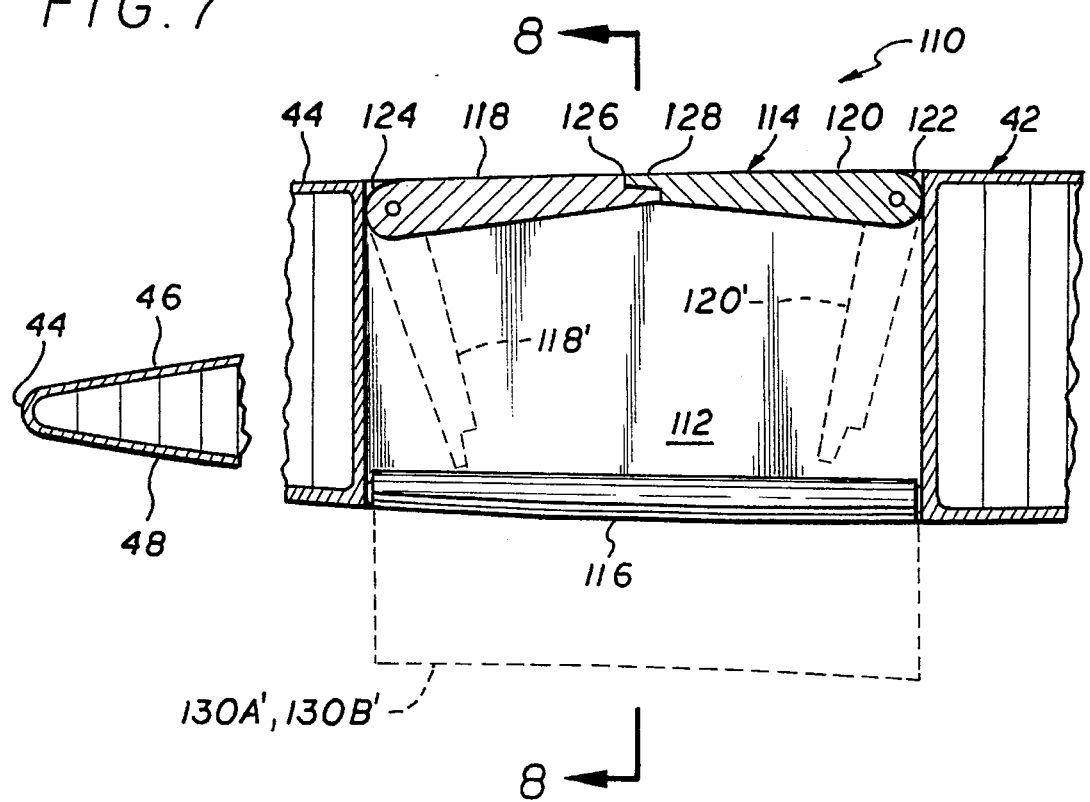
FIG. 7 is a view similar to FIG. 3 illustrated a third embodiment of system.
Figure 8:
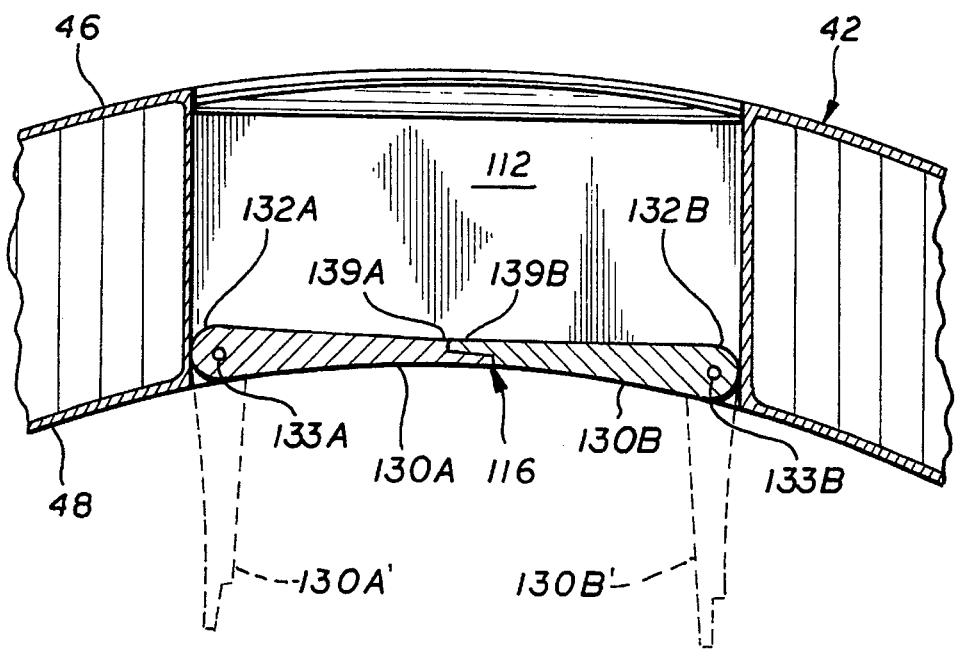
FIG. 8 is a partial cross-sectional view of FIG. 7 taken along the line 8-.

Illustrated in FIGS. 7 and 8 is a third embodiment of the invention. Here the system, generally indicated by numeral 110, includes a plurality of slots 112, each having an opening 114 on the external surface 46 and an exit 116 on the internal surface 48 of the exhaust nozzle portion 42. A pair of doors 118 and 120 are pivotally mounted by their first ends 122 and 124 to the fore and aft ends, respectively, of the slot 112 in proximity to the opening 114, such that when in the closed position their second ends 126 and 128 over lap sealing off the slot 112. The doors 118 and 120 are also spring biased to the closed position in a manner similar to the system 50 shown in FIGS. 3 and 4. A pair of doors 130A and 130B are pivotally mounted by their first ends 132A and 132B in proximity to the exit 116 of the slot 112 having pivot axis 133A and 133B aligned with the duct. These doors 130A and 130B are also spring biased to the closed position. Thus when in the closed position, their opposite ends 134A and 134B are in an over lapping relationship sealing off the slot 112. When the fan is operating in the reverse thrust mode causing the pressure within the exhaust duct to drop below ambient, the doors 118, 120, 130A and 130B will move to their open positions indicated in dotted lines an numerals 118', 120' and 130A, B, respectively, providing increased air flow into the exhaust nozzle portion 42, improving efficiency. Note that, because the doors 130A and 130B have a pivot axis aligned with the flow, thus there is no possibility that the fans will remain open when the fan thrust is again providing forward thrust.

Figure 9:
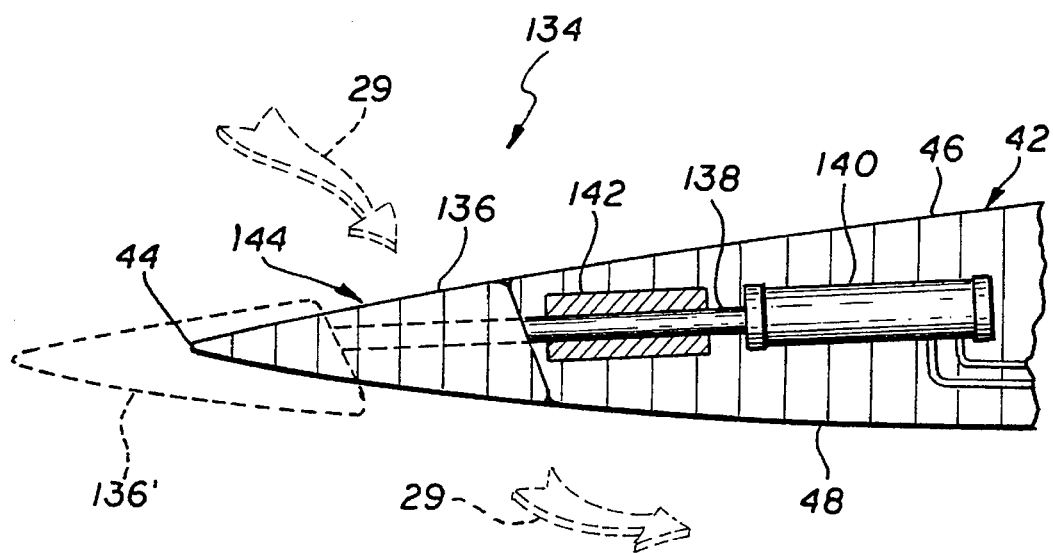
FIG. 9 is a view similar to FIG. 3 illustrating a fourth embodiment of the system.
Figure 10:
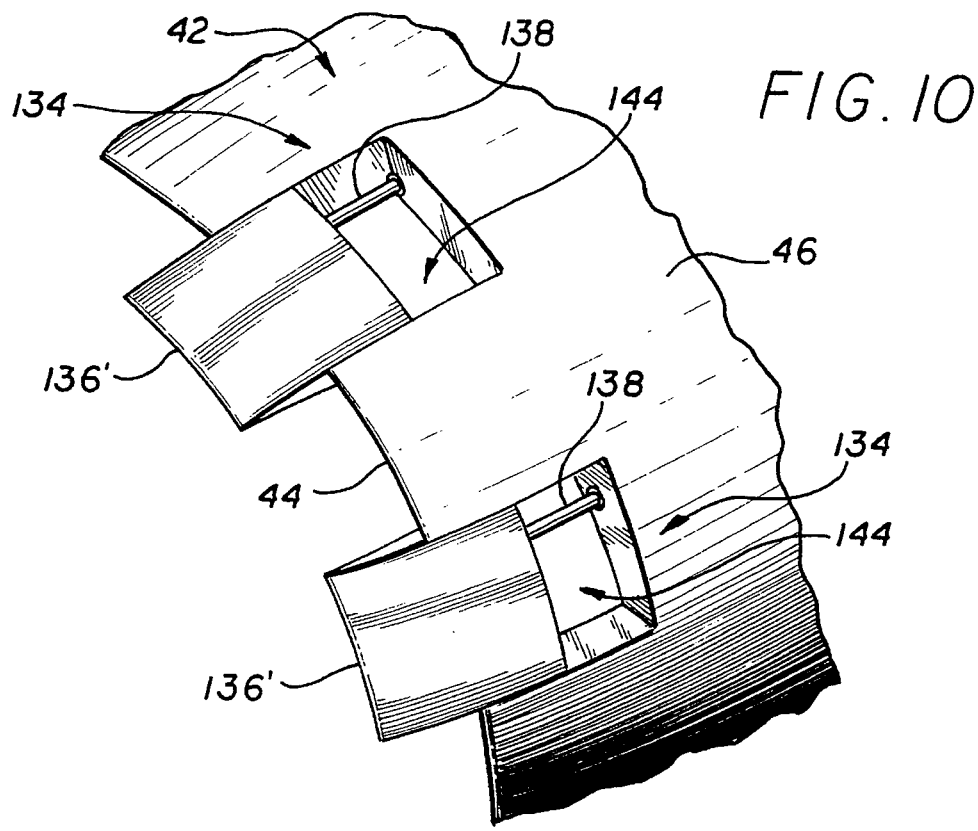
FIG. 10 is a partial perspective view of the exhaust nozzle of the shroud similar to that shown in FIG. 6 illustrating the fourth embodiment of the system shown in FIG. 9 in the activated mode.

Illustrated in FIGS. 9 and 10 is a fourth embodiment of the system, generally indicated by numeral 134 wherein the exhaust nozzle portion 42 includes a plurality of rearward extendible slats 136. The slats 136 are attached to the output shaft 138 of a hydraulic cylinder 140 that is supported by a bearing 142. When the hydraulic cylinder 140 is actuated the slat 136 is moved rearward, indicated in dotted lines and numeral 136' creating a slot 144. Thus when the fan is operating in the reverse thrust mode, the slats 136 are moved aft opening the slots 144.

Figure 11:
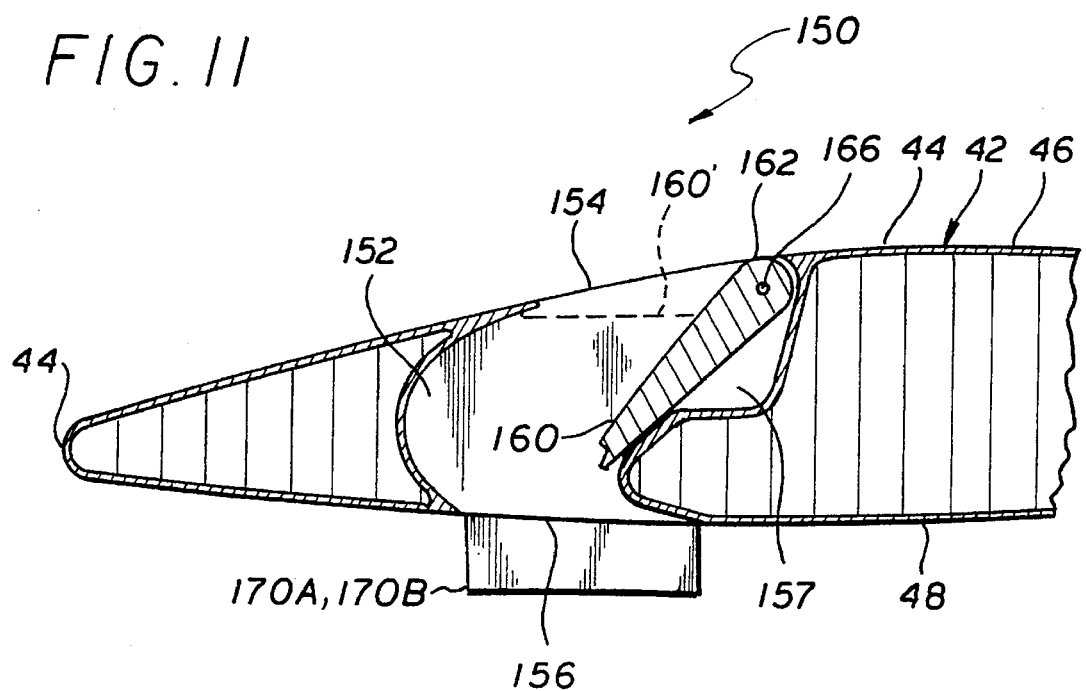
FIG. 11 is also a view similar to FIG. 3 illustrating a fifth embodiment of the system.
Figure 12:
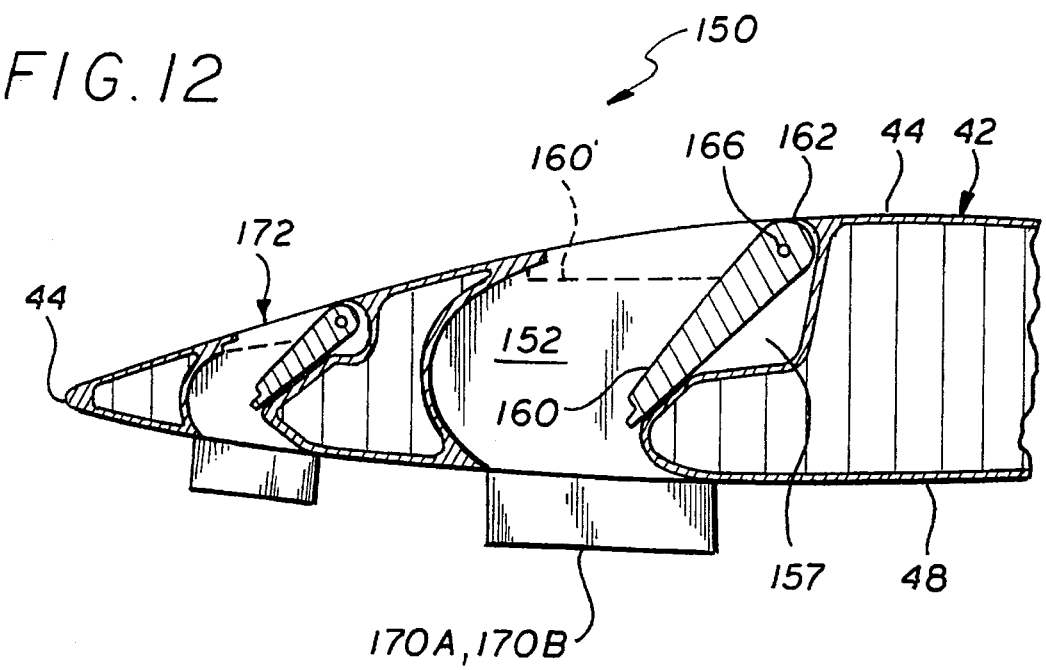
FIG. 12 is again a view similar to FIG. 3 illustrating a sixth embodiment of the system.

Another embodiment is illustrated in FIG. 11 and is generally designated by numeral 150. The system 150 includes a plurality of chevron shaped slots 152 in the exhaust nozzle portion 42 just forward of the trailing edge 44, with each slot having an opening 154 on the external surface 46 and an exit 156 on the internal surface 48. The slots 152 also include a recess 157 positioned at the forward end of that forms part of the opening 154. A door 160 is pivotally mounted at its rear end 162 to the forward end of the recess 157 with a pivot axis indicated by numeral 166. Thus the door 160 is rotatable from the open position as shown to a closed position, shown in dotted lines and indicated by numeral 160'. The door 160 is also spring biased to the closed position by a spring mechanism similar to that shown in FIG. 4. A pair of doors 170A and 170B, similar to the doors 130A and 130B illustrated in FIGS. 7 and 8, are mounted in the exit 156 of the slot 152 having their axis of rotation aligned with the exhaust duct and spring biased to the closed position. When the fan is operating in the reverse thrust mode, the air pressure within the exhaust nozzle will drop below ambient and the doors 160 and 170A and 170B will be "sucked" open. When the fan returns to normal operation, the doors will automatically return to their closed positions. Again, such a design will eliminate the possibility of the doors being held open when the fan is moved to the forward thrust position. However, such a design may require a slightly larger trailing edge radius then desired for the exhaust nozzle, but the loss in efficiency will be slight.

The efficiency of the embodiment illustrated in FIG. 11 can be improved by incorporating a second and smaller version of the system 150 in between it and the trailing edge 44, indicated by numeral 170. The features are identical except for size. In this version, with the increased efficiency, the trailing edge 44 can remain sharp edged. Thus the efficiency of the shroud under cruise conditions need not be compromised to achieve sufficient efficiency when providing reverse thrust during docking maneuvers.

While the invention has been described with reference to a particular embodiments, it should be understood that the embodiments are merely illustrative as there are numerous variations and modifications which may be made by those skilled in the art. Thus, the invention is to be construed as being limited only by the spirit and scope of the appended claims.

INDUSTRIAL APPLICABILITY

The invention has applicability to the aircraft industry.

I claim:

1. In a shroud for a reversible thrust fan, the shroud having a inlet duct and an exhaust nozzle with the fan located there between, a system for increasing the efficiency of the exhaust nozzle when acting as an inlet duct when the fan is providing reverse thrust, the system comprising:

a plurality of first slots spaced about the circumference of the exhaust nozzle in proximity to the rear end thereof, said slots extending from the exterior surface of the exhaust nozzle to the interior surface thereof;

an airfoil pivotally mounted to the aft end of each said first slot having a portion of the top surface thereof conforming to the contour of the external surface of the exhaust nozzle and a bottom surface conforming to the internal surface of said exhaust nozzle, said airfoil movable from a closed position wherein said top surface thereof is aligned with the contour of the external surface of the exhaust nozzle to an open position aligned with the aft end of said slot;

means to bias said airfoil toward said closed position;

a plurality of second slots having an opening on the top external surface of the exhaust nozzle forward of the opening of said opening of said first slots and a rearward extending passage extending through the shroud and exiting into said passageway of said first slots;

a second airfoil pivotally mounted to the forward end of said second slot having a top surface thereof conforming to the contour of the external surface of the exhaust nozzle, said second airfoil movable from a closed position wherein said top surface thereof is aligned with the contour of the external surface of the exhaust nozzle to an open position aligned with the forward end of said second slot; and second means to bias said second airfoil to said closed position.

2. The system as set forth in claim 1 wherein said forward wall of said first duct and said top surface of said airfoil are contoured to form an aerodynamically smooth airflow passage from the exterior surface to the interior surface of the exhaust nozzle when said airfoil is in said open position.

\* \* \* \* \*